(12) United States Patent
Cool et al.

(10) Patent No.: US 10,767,715 B2
(45) Date of Patent: Sep. 8, 2020

(54) PIVOTABLE ACTUATOR MOUNTING DEVICE

(71) Applicant: Bendix Spicer Foundation Brake LLC, Elyria, OH (US)

(72) Inventors: Lonnie F Cool, North Olmsted, OH (US); Richard L Lantz, Clinton, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 35 days.

(21) Appl. No.: 16/157,685

(22) Filed: Oct. 11, 2018

(65) Prior Publication Data
US 2020/0116223 A1 Apr. 16, 2020

(51) Int. Cl.
| | | |
|---|---|---|
| *F16D 65/18* | (2006.01) | |
| *F16D 55/02* | (2006.01) | |
| F16D 55/00 | (2006.01) | |
| F16D 121/08 | (2012.01) | |
| F16D 125/02 | (2012.01) | |

(52) U.S. Cl.
CPC .............. *F16D 65/18* (2013.01); *F16D 55/02* (2013.01); *F16D 2055/0016* (2013.01); *F16D 2121/08* (2013.01); *F16D 2125/02* (2013.01); *F16D 2250/0084* (2013.01)

(58) Field of Classification Search
CPC .................................. F16D 65/18; F16D 55/02
See application file for complete search history.

(56) References Cited

U.S. PATENT DOCUMENTS

| | | | | |
|---|---|---|---|---|
| 3,422,933 | A | * | 1/1969 | Flory .................... F16D 55/227 188/72.2 |
| 3,800,920 | A | | 4/1974 | Warwick |
| 4,334,599 | A | * | 6/1982 | Ritsema ............ F16D 55/22655 188/73.45 |
| 4,441,592 | A | * | 4/1984 | Everett ................... B62L 1/005 188/24.12 |
| 4,830,149 | A | | 5/1989 | Giering |
| 4,906,036 | A | * | 3/1990 | James ................. E05B 63/0056 292/202 |

(Continued)

FOREIGN PATENT DOCUMENTS

| | | |
|---|---|---|
| CA | 1047417 A | 1/1979 |
| DE | 102005018038 A1 | 10/2006 |

(Continued)

OTHER PUBLICATIONS

Bendix Spicer Foundation Brake LLC, "Bendix Endurasure and Endurasure-Pro Spring Brake Chambers," Service Data Sheet, Oct. 2017, 12 pages, Bendix Spicer Foundation Brake LLC, Elyria OH USA.

(Continued)

*Primary Examiner* — Vishal R Sahni
(74) *Attorney, Agent, or Firm* — Cheryl Greenly; Brian Kondas; Eugene Clair

(57) ABSTRACT

A braking assembly for an air disc brake comprises an actuator assembly having a service portion, at least one mounting stud attached to the service portion, and an air disc brake caliper having a bore for receiving the at least one mounting stud. The mounting stud is pivotable with respect to the service portion for installation on the air disc brake caliper.

13 Claims, 5 Drawing Sheets

(56) References Cited

U.S. PATENT DOCUMENTS

| | | | |
|---|---|---|---|
| 4,938,318 A * | 7/1990 | Ishibashi | B62L 1/16 188/196 M |
| 5,016,523 A | 5/1991 | Bowyer | |
| 5,326,206 A * | 7/1994 | Moore | F16B 5/0208 29/525.02 |
| 5,501,301 A * | 3/1996 | Nishimura | B62L 1/005 188/24.12 |
| 5,787,794 A | 8/1998 | Plantan | |
| 5,957,032 A | 9/1999 | Hicks | |
| 6,666,308 B1 | 12/2003 | DeVries | |
| 7,493,994 B2 | 2/2009 | Plantan | |
| 8,319,384 B2 | 11/2012 | Hanlon | |
| 8,397,882 B2 | 3/2013 | Hemery | |
| 8,573,370 B2 | 11/2013 | Maehara | |
| 8,844,682 B2 | 9/2014 | Perrault | |
| 9,050,958 B2 | 6/2015 | Gaufin | |
| 9,566,968 B2 | 2/2017 | Murayama | |
| 9,623,855 B2 * | 4/2017 | Huber | B60T 17/08 |
| 2008/0047787 A1 | 2/2008 | Scheckelhoff | |
| 2009/0159383 A1 * | 6/2009 | Roberts | F16J 1/008 188/305 |
| 2011/0005871 A1 | 1/2011 | Pericevic | |
| 2011/0031079 A1 * | 2/2011 | Matsushita | B60T 7/102 188/344 |
| 2011/0113608 A1 | 5/2011 | Pulphus | |
| 2013/0333985 A1 * | 12/2013 | Takachi | B62L 1/06 188/24.22 |
| 2014/0231191 A1 * | 8/2014 | Morais | F16D 65/0062 188/73.31 |
| 2016/0102718 A1 * | 4/2016 | Polack | B60T 13/748 188/72.1 |
| 2018/0274609 A1 | 9/2018 | Cool | |

FOREIGN PATENT DOCUMENTS

| | | | |
|---|---|---|---|
| EP | 545358 A1 | 6/1993 | |
| EP | 2342473 A2 | 3/2013 | |
| GB | 985257 | * | 3/1965 |
| WO | WO2018183142 A1 | 10/2018 | |

OTHER PUBLICATIONS

Bendix Spicer Foundation Brake LLC, "Bendix ADDBS22X, ADB22X-V & ADB22X-LT Air Disc Brakes," Service Data Sheet, Nov. 2017, 44 pages, Bendix Spicer Foundation Brake LLC, Elyria OH USA.

European Patent Office, "International Search Report and Written Opinion," Opinion, dated Jan. 14, 2020, 26 pages, European Patent Office, Rijswijk Netherlands.

* cited by examiner

PIVOTABLE ACTUATOR MOUNTING DEVICE

BACKGROUND

The present invention relates to embodiments of an apparatus to mount an actuator assembly to an air disc brake caliper for an air brake equipped vehicle.

Air disc brakes convert air pressure into braking force. When the driver applies the vehicle brake pedal, air enters the service brake chamber of an actuator assembly through a supply port. The pressure expands a diaphragm, moving a pressure plate and a pushrod of the actuator assembly forward. When the actuator assembly is mounted to an air disc brake assembly, the pushrod acts against an internal lever of the air disc brake, resulting in movement of the inner brake pad toward the rotor. Further movement of the bridge inside the air disc brake forces the caliper away from the rotor, pulling the outer brake pad into the rotor. Proper alignment of the actuator assembly with respect to the caliper body of the air disc brake is necessary to ensure that the push rod correctly acts on the lever. A very precise angle may need to be maintained between the axis of the caliper and the axis of the actuator when mounting.

Some actuator assemblies have at least one fixed bolt for attachment to the caliper. A special tool is used to affix a nut to the bolt when the actuator is set flush with a face of the caliper. In some configurations, the tool is unable to surround the nut for proper installation due to the angle of insertion of the bolt into the caliper and interference with the body of the caliper. If the actuator is not flush with the caliper, there may be reduced function or loss of function of the air disc brake assembly. Therefore, there is a need for an improved method and apparatus for mounting an actuator assembly to a caliper in a braking assembly.

SUMMARY

Various embodiments of an actuator assembly comprise an actuator housing having a service portion and at least one mounting stud attached to the service portion. The at least one mounting stud is pivotable with respect to the actuator housing.

In accordance with another aspect, various braking assemblies for an air disc brake comprise an actuator assembly having a service portion; at least one mounting stud attached to the service portion, and an air disc brake caliper having a bore for receiving the at least one mounting stud. The mounting stud is pivotable with respect to the service portion for installation on the air disc brake caliper.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
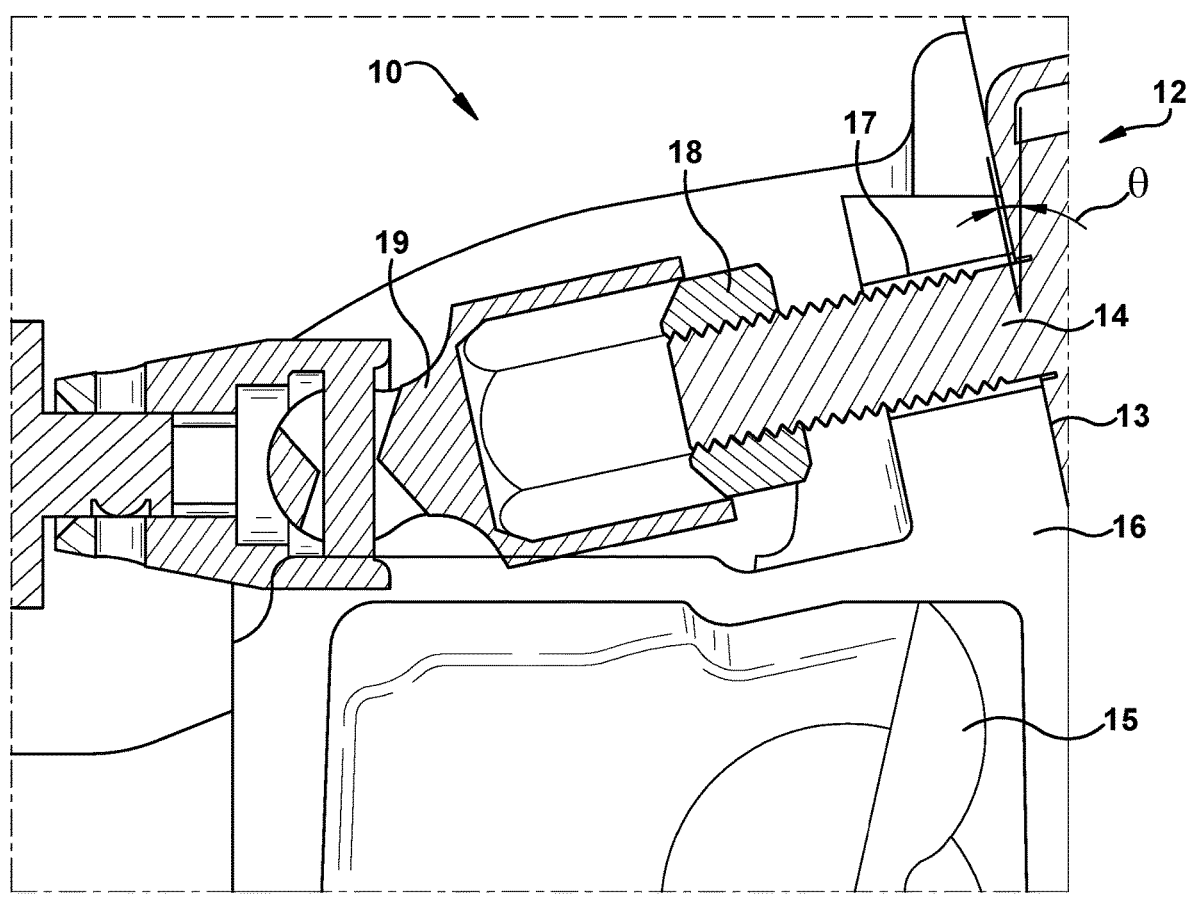
FIG. 1 illustrates a cross section of a prior art actuator assembly and air disc brake assembly.

FIG. 1 illustrates a cross section of an actuator assembly 12 as mounted on an air disc brake caliper 16 as part of a prior art brake assembly 10. The actuator assembly 12 may be an Endurasure™ spring brake chamber, available from Bendix Spicer Foundation Brake LLC of Elyria Ohio. The caliper 16 may be part of an ADB22X™ air disc brake, also available from Bendix Spicer Foundation Brake LLC. The actuator assembly 12 includes at least one fixed fastener 14. The fastener 14 may be welded or otherwise permanently affixed to the housing of the actuator assembly 12. The fastener 14 is generally a threaded bolt affixed parallel to the central axis of the actuator assembly 12.

An angle, theta, is established so that the push rod (not shown) of the actuator assembly 12 acts upon a lever 15 inside the air disc brake caliper 16. A face 13 of the caliper 16 is generally at the angle theta with respect to the axis of the brake assembly 10 to accept the actuator assembly 12. The angle theta is typically between zero degrees and twelve degrees to provide clearance for other wheel end components. The fastener 14 of the actuator assembly 12 is positioned through a bore 17 that exits at the face 13 of the caliper 16. The bore 17 is drilled into the caliper 16 at the angle required for the proper mounting of the actuator assembly 12 and normal to the face 13 of the caliper 16. A nut 18 is required to be threaded onto the fastener 14 to hold the actuator assembly 12 in place on the caliper 16. In general, a tool 19 is used to fasten the nut 18 to the fastener 14. The tool 19 may not fit properly over the fastener 14 and interfere with the caliper 16 due to the angle of the bore 17.

Figure 2:
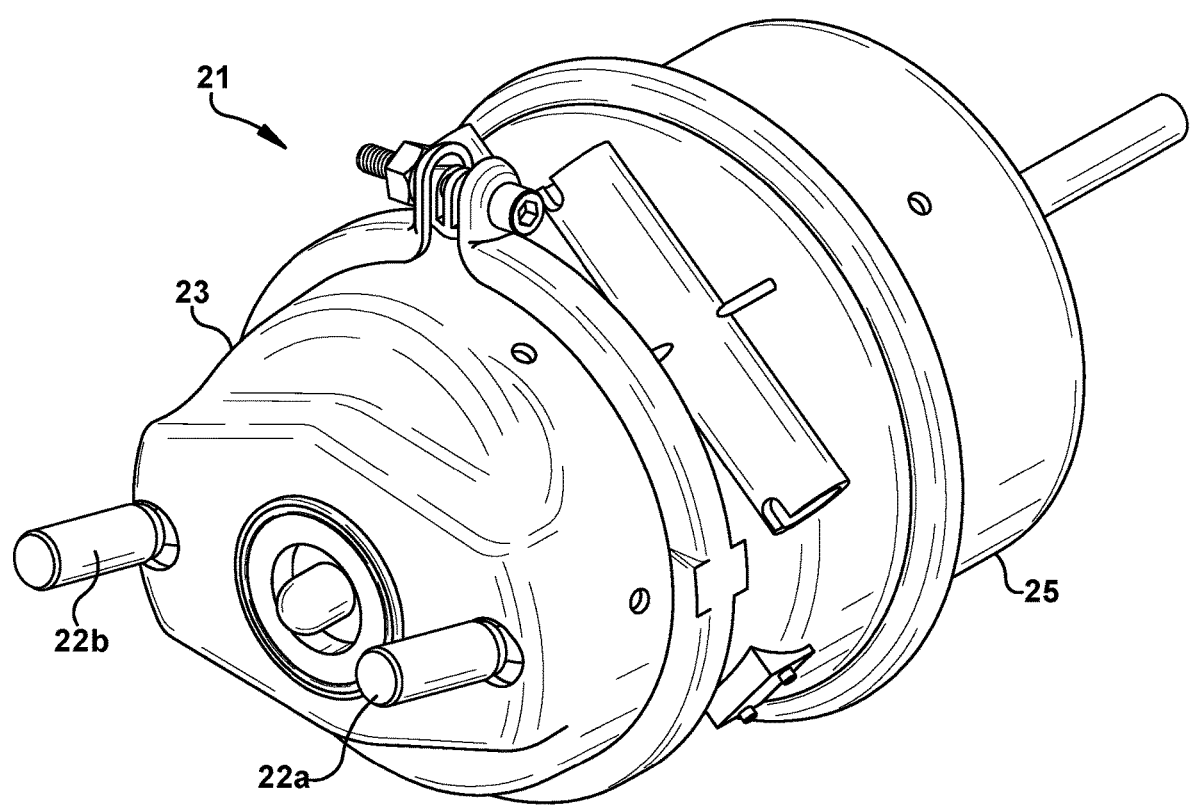
FIG. 2 illustrates the actuator assembly having two pivotable mounting studs as installed on the actuator assembly.

FIG. 2 illustrates an actuator assembly 21 having two mounting studs 22a, 22b according to an example of this invention. The actuator assembly 21 has a service side housing 23 and a parking side housing 25. Some actuators may only have a service side housing. The two mounting studs 22a, 22b are affixed to the service side housing 23.

Figure 3:
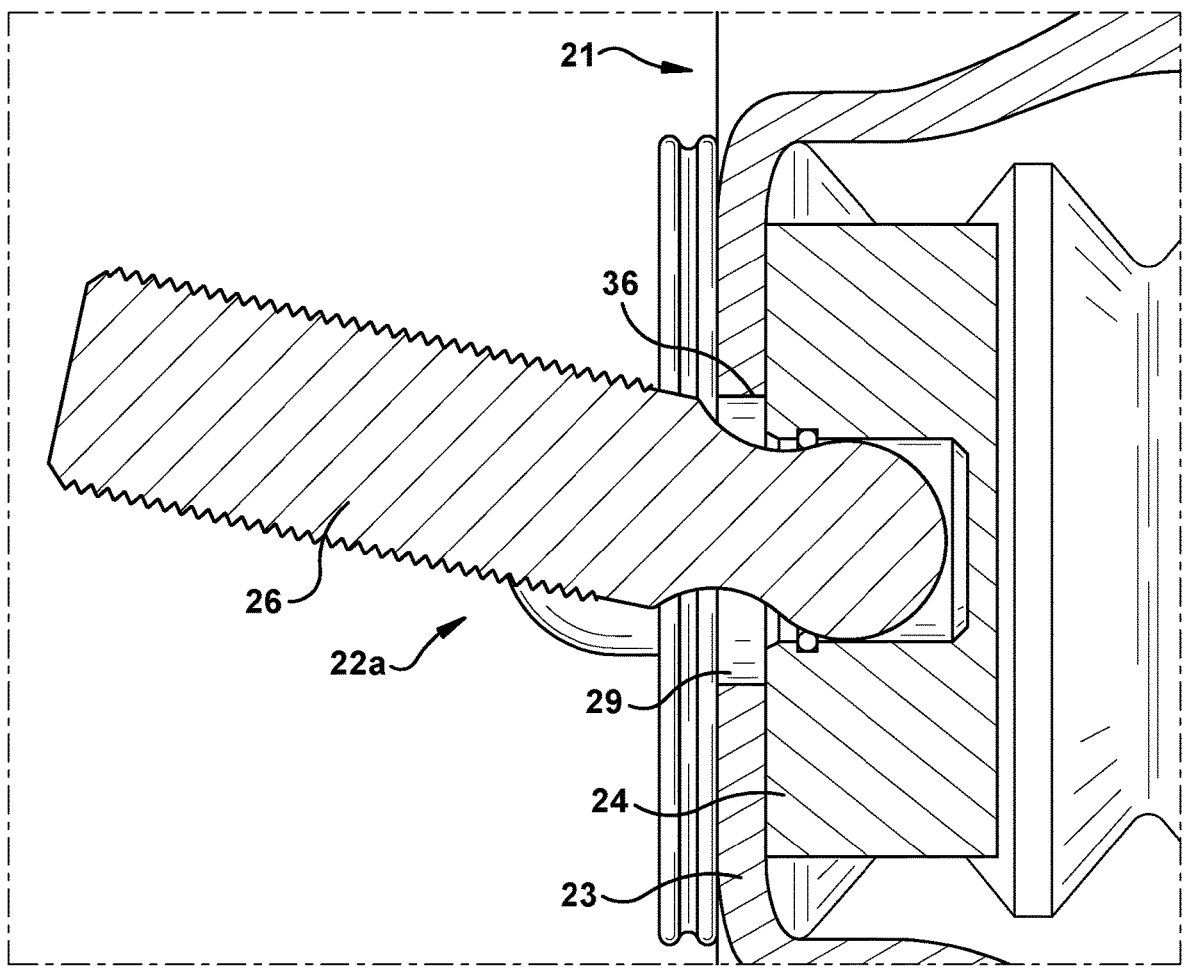
FIG. 3 illustrates a cross section of the actuator assembly of FIG. 2 showing one of the pivotable mounting studs.

FIG. 3 illustrates a cross section of the actuator assembly 21 showing mounting stud 22a. Mounting stud 22a comprises a threaded portion 26 and a receiving portion 24. The receiving portion 24 is welded or otherwise affixed to the interior of the service side housing 23 adjacent to an aperture 29. The threaded portion 26 is placed through the aperture 29 into the receiving portion 24. A snap ring 36 is placed over the head of the threaded portion 26 so that it remains in the receiving portion 24. The structure of the threaded portion 26 and receiving portion 24 are such that the threaded portion 26 can pivot in one plane with respect to the receiving portion 24.

Therefore, an actuator assembly comprises an actuator housing having a service portion and at least one mounting stud attached to the service portion. The at least one mounting stud is pivotable with respect to the actuator housing.

Figure 4:
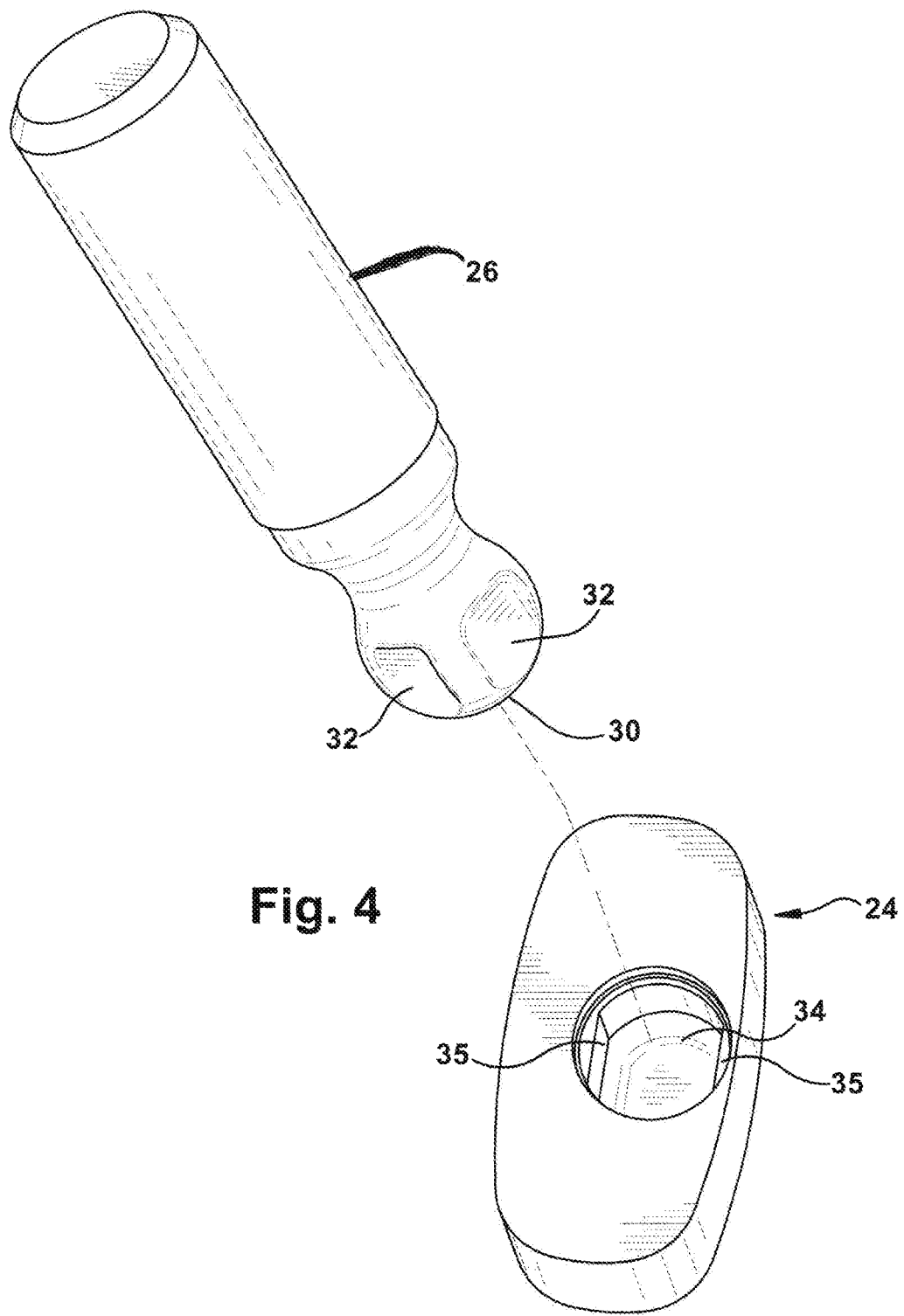
FIG. 4 illustrates the threaded portion and receiving portion of a pivotable mounting stud.

FIG. 4 illustrates the threaded portion 26 and receiving portion 24 as two separate pieces. The threaded portion 26 includes a ball portion 30 at one end. In one example, the threaded portion 26 is about ⅝" diameter. The ball portion 30 is also about ⅝" diameter. The ball portion 30 may have flats 32 to restrict the rotation of the threaded portion 26 once it is installed in the receiving portion 24.

The receiving portion 24 includes a socket 34. The socket 34 may also have flat portion 35 to mate with the flats 32 of the threaded portion 26. In this manner, the threaded portion 26 will not rotate but rather be able to pivot in a single plane once installed. The angle of the pivot is controlled by the geometry of the mounting stud with respect to the features of the actuator assembly.

Alternatively, a pin can be placed axially through a hole in the threaded portion and the receiving portion to hold threaded portion in the receiving portion while allowing the threaded portion to pivot.

The materials of the receiving portion 24 and threaded portion 26 are metallic, such as stainless steel. The materials can be the same in order to facilitate movement between the receiving portion 24 and threaded portion 26.

Figure 5:
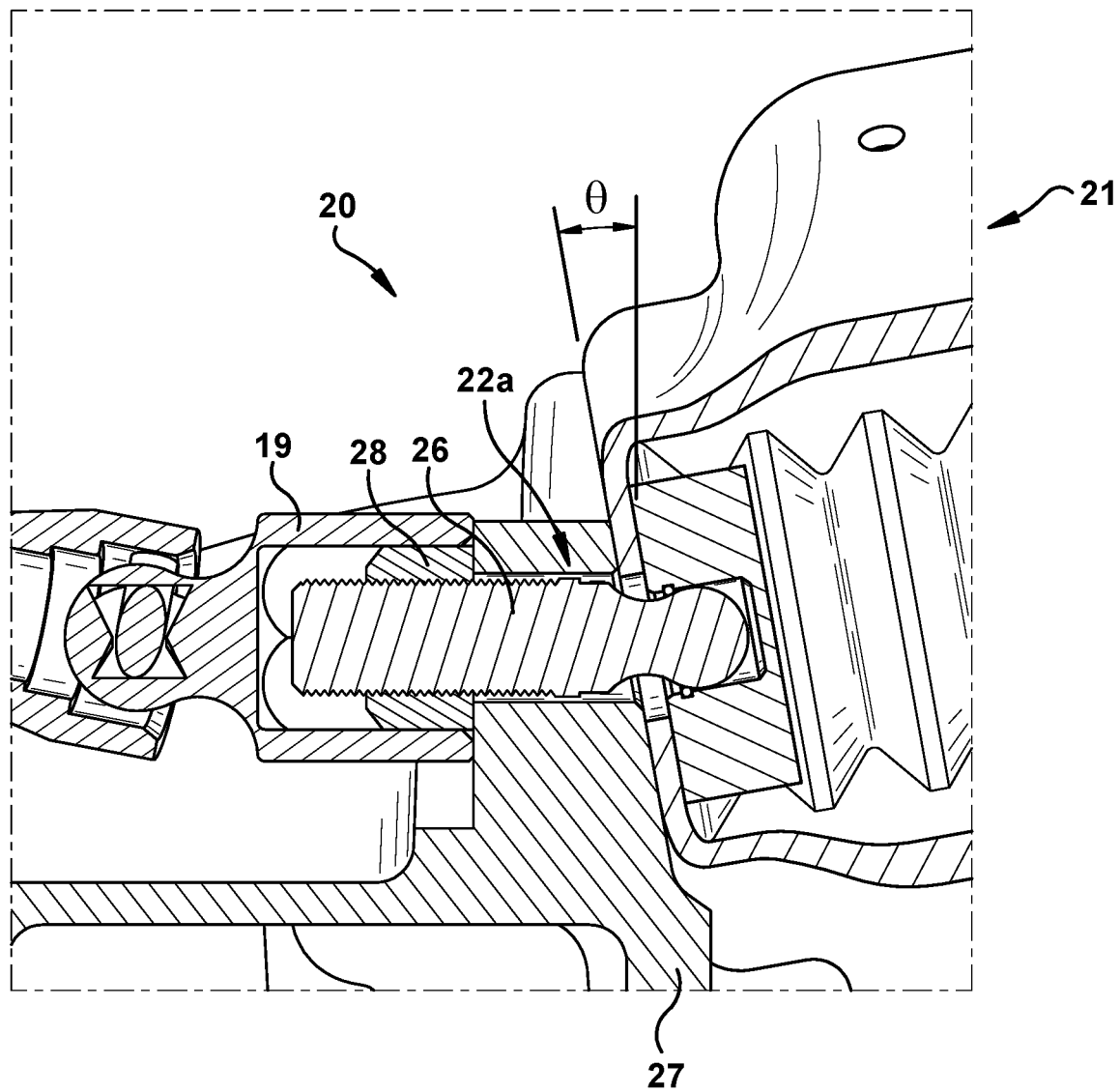
FIG. 5 illustrates a cross section of the actuator assembly as mounted to an air disc brake assembly according to one example of the present invention.

FIG. 5 illustrates a brake assembly 20 having the actuator assembly 21 of the present invention. The actuator assembly 21 mates with a caliper 27 of an air disc brake to form the brake assembly 20.

The actuator assembly 21 includes mounting stud 22a. The threaded portion 26 of mounting stud 22a is positioned through a bore 28 in the caliper 27. The angle at which the bore 28 is drilled is no longer required to be normal to the angled mounting face of the caliper 27. The bore 28 is drilled parallel to the axis of the caliper 27. The tool 19 fits over the threaded portion 26 without interfering with the caliper 27 in order to fasten the nut 18 onto the threaded portion 26. As the nut 18 is threaded, the actuator assembly 21 is pulled flush to the face of the caliper 27 at the required angle theta.

With the actuator assembly 21 having the pivotable mounting studs 22a, 22b, nearly any angle theta between 0 degrees and 45 degrees can be contemplated. One application may include angles between 0 and 20 degrees. The restrictions are based on the angled mounting face of the caliper 27 and the envelope in which the entire brake assembly 20 must fit in on a vehicle.

Therefore, various braking assemblies for an air disc brake comprise an actuator assembly having a service portion; at least one mounting stud attached to the service portion, and an air disc brake caliper having a bore for receiving the at least one mounting stud. The mounting stud is pivotable with respect to the service portion for installation on the air disc brake caliper.

A brake assembly having the features of the present invention is easier to assembly since there is more space to maneuver the tool to attach the nut. Additional envelope space is provided in the caliper for inner mechanisms since the bore hole can be parallel to the caliper axis. Another advantage is that actuators with traditional non-pivoting fasteners would not fit on the calipers with the different mounting bore angle.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. An actuator assembly for an air brake system comprising:
   an actuator housing having a service portion;
   two apertures in the service portion of the actuator housing of the actuator assembly;
   two receiving portions affixed to an interior of the service portion at each of the two apertures; and
   two mounting studs, each of the two mounting studs having a threaded portion at a first end and a rounded head opposite the first end, each rounded head inserted into each receiving portion, wherein each threaded portion is exterior to the actuator housing and the two mounting studs pivot in a plane parallel to an axis of the actuator assembly during installation of the actuator assembly to an associated air disc brake caliper.

2. The actuator assembly as in claim 1, wherein the two mounting studs and the two apertures are sized to allow pivoting between zero and about twenty degrees with respect to the axis of the actuator housing.

3. The actuator assembly as in claim 1, further comprising a snap ring for holding each mounting stud in each receiving portion.

4. The actuator assembly as in claim 1, further comprising a pin for holding each mounting stud in each receiving portion.

5. The actuator assembly as in claim 1, wherein the two apertures are radially equidistant from the axis of the actuator assembly.

6. A braking assembly for an air disc brake equipped vehicle comprising:
   an actuator assembly having a service portion housing, the housing having at least two apertures;
   at least two receiving portions affixed to an interior of the service housing at each of the at least two apertures;
   at least two mounting studs, each of the at least two mounting studs having a threaded portion at a first end and a rounded head opposite the first end, wherein each rounded head is mated with each of the at least two receiving portions, the threaded portion of each mounting stud being exterior to the service portion housing and the at least two mounting studs being pivotable with respect to the service portion housing; and
   an air disc brake caliper having an angled mounting face with respect to a centerline of the air disc brake caliper and at least two bores through the angled mounting face for receiving each of the threaded portions of the at least two mounting studs.

7. The braking assembly as in claim 6, wherein the at least two bores are parallel to the centerline of the air disc brake caliper.

8. The braking assembly as in claim 6, wherein the mating of the actuator assembly with the air disc brake caliper forms an air tight seal.

9. The braking assembly as in claim 6, wherein the angled mounting face is between a zero degree and about twenty degree angle with respect to the centerline of the air disc brake caliper.

10. The braking assembly as in claim 6, wherein each threaded portion mates with a nut through each of the at least two bores in the air disc brake caliper.

11. The braking assembly as in claim 10, wherein the air disc brake caliper is sized to receive a tool to install the nut on each threaded portion wherein the tool does not interfere with a housing of the air disc brake caliper.

12. The braking assembly as in claim 9, wherein the actuator assembly mounts flush to the angled mounting face when installed to the caliper.

13. The braking assembly as in claim 10, wherein the actuator assembly pivots with respect to the caliper as each nut is threaded to each threaded portion to mount flush with the angled mounting face.

* * * * *